(12) United States Patent
Lai et al.

(10) Patent No.: US 7,626,905 B2
(45) Date of Patent: Dec. 1, 2009

(54) METHOD AND DEVICE FOR PROTECTING A SLICER IN READING SIGNALS ON A DEFECT DISC

(75) Inventors: Yi-Lin Lai, Taipei (TW); Yi-Sung Chan, Taipei (TW)

(73) Assignee: Via Technologies, Inc., Taipei (TW)

( * ) Notice: Subject to any disclaimer, the term of this patent is extended or adjusted under 35 U.S.C. 154(b) by 573 days.

(21) Appl. No.: 11/376,172

(22) Filed: Mar. 16, 2006

(65) Prior Publication Data

US 2006/0215519 A1 Sep. 28, 2006

Related U.S. Application Data

(60) Provisional application No. 60/662,351, filed on Mar. 17, 2005.

(51) Int. Cl.
*G11B 27/36* (2006.01)
(52) U.S. Cl. ............... 369/53.15; 369/44.28; 369/47.14
(58) Field of Classification Search ............. 369/53.15, 369/59.21, 44.32, 44.41, 44.35, 124.14, 53.16, 369/53.17, 47.14; 386/126; 327/156; 331/16
See application file for complete search history.

(56) References Cited

U.S. PATENT DOCUMENTS

| | | | |
|---|---|---|---|
| 5,831,949 A | * | 11/1998 | Kim ........................ 369/44.35 |
| 6,084,836 A | * | 7/2000 | Kamiyama ............... 369/44.41 |
| 6,188,060 B1 | * | 2/2001 | Kim et al. ................ 369/44.32 |
| 6,218,875 B1 | * | 4/2001 | Mizokuchi .................. 327/156 |
| 7,154,830 B2 | * | 12/2006 | Huang ...................... 369/53.15 |
| 7,555,205 B2 | * | 6/2009 | Yamaoka et al. ............ 386/126 |
| 2004/0088637 A1 | | 5/2004 | Wada |
| 2004/0145987 A1 | | 7/2004 | Ryu et al. |
| 2004/0257946 A1 | | 12/2004 | Huang |

FOREIGN PATENT DOCUMENTS

JP        61-208634 A        9/1986

\* cited by examiner

*Primary Examiner*—Hoa T Nguyen
*Assistant Examiner*—Kim-Kwok Chu (57) ABSTRACT

A device for protecting a slicer in reading signals on a defect disc from disturbance and instability is provided. The device includes a defect detection unit, a slicer and a logic combination unit. The defect detection unit receives a plurality of defect detection signals to detect various defects for setting a plurality of defect flag signals, wherein the plurality of defect detection signals at least include an envelope signal of a RF signal and bit modulation signals. The slicer receives and digitalizes the RF signal. The logic combination unit performs logic operation on the defect flag signals in order to detect a specified defect and to trigger defect protection for the slicer. A method for protecting a slicer in reading signals on a defect disc is also provided.

8 Claims, 7 Drawing Sheets

METHOD AND DEVICE FOR PROTECTING A SLICER IN READING SIGNALS ON A DEFECT DISC

RELATED APPLICATIONS

The present application is based on, and claims priority from, U.S. Application No. 60/662,351, filed Mar. 17, 2005, the disclosure of which is hereby incorporated by reference herein in its entirety.

BACKGROUND OF THE INVENTION

1. Field of the Invention

This invention generally relates to the field of device protection of Optical disc drive (ODD). More particularly, the present invention relates to a method and device that protects a slicer of ODD in reading signals on a defect disc.

2. Description of the Prior Art

Nowadays, disc-type storage media are broadly used in keeping data due to their storage capacity. Such disc-type storage media like optical discs, i.e. CD-R discs, CD-RW discs, DVD-R discs, DVD-RW discs, DVD+R discs, DVD+RW discs, or DVD-RAM discs etc., also provide better protection to the data stored on them against damage. However, these characteristics mentioned above do not mean the optical discs are faultless storage media for storing data because some defects might either take place on their surfaces. For example, a deep scratch, a shallow scratch, and even a fingerprint. These defects could result in not only reading or writing errors but also a system disturbance while the system reads or writes data. Hence, it is an important thing to detect existing defects for protecting the system from a disturbed or instable situation.

Figures 1A, 1B:
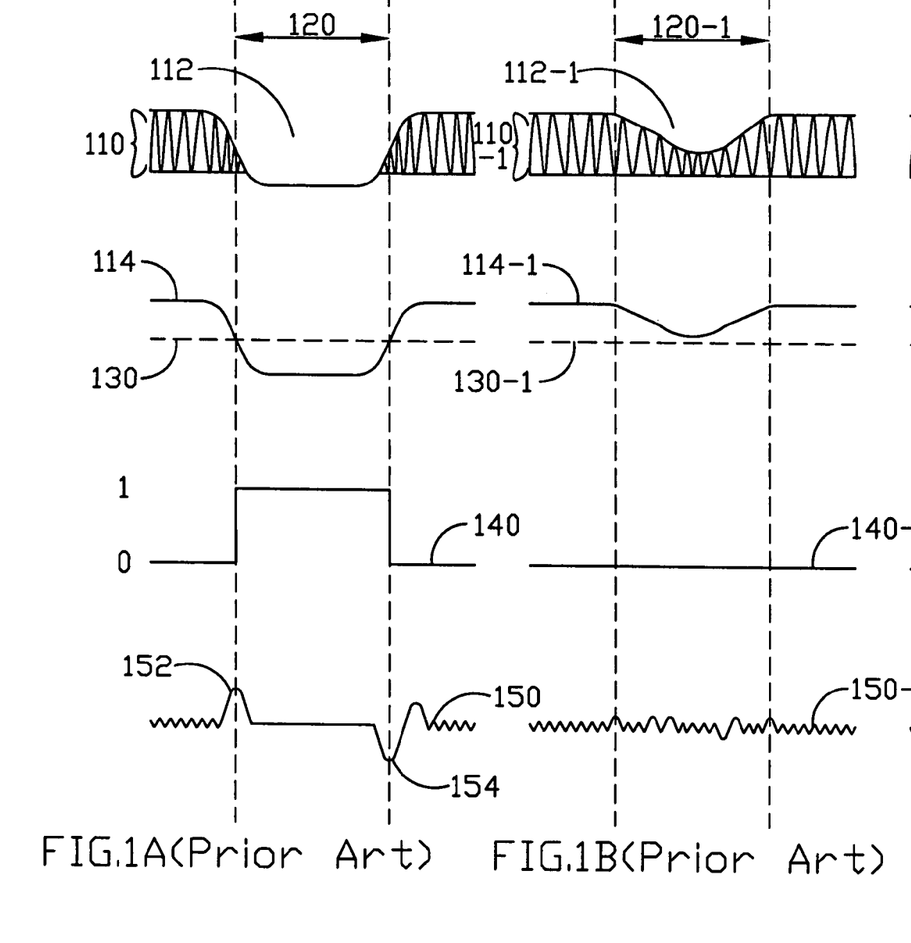
FIG. 1A illustrates signals of a deep defect detected by applying well-known RFLVL detection.
FIG. 1B illustrates signals of a shallow defect detected by applying well-known RFLVL detection.

It is well known to use the difference of signal amplitude, such as an RF level (RFLVL) or a sub-beam added (SBAD) signal, to detect an existing defect. FIG. 1A illustrates signals of a deep defect detected by applying well-known RFLVL detection. As shown in FIG. 1A, a defect detection applying the RFLVL is illustrated. An RF signal 110 has a hollow region 112 in a time period 120. That means the corresponding data of the hollow region 112 is damaged by a defect, so that the RF signal 110 in the time period 120 cannot be read out. Further, the depth of the hollow region 112 represents the depth of the defect. An RFLVL signal 114, which is formed from the RF signal 110 passing a low pass filter, shows the envelope of the RF signal 110. A detection threshold 130 is a fixed DC referred voltage level. As the RFLVL signal 114 is lower than the detection threshold 130 in the time period 120, a defect flag signal 140 is raised from "0" to "1". Moreover, a FE/TE signal 150 respectively generates a positive surge 152 and a negative surge 154 at the beginning and the end of the time period 120 to indicate a focusing and a tracking error signal. However, while the defect flag signal 140 is set from "0" to "1", a servo system, such as a focusing or a tracking servo, and a data path control system, such as a preamplifier, a slicer, or a phase lock loop (PLL), can detect a defect signal and then reduce the potential disturbance and instability through applying some appropriately protective methods and devices.

FIG. 1B illustrates signals of a shallow defect detected by applying well-known RFLVL detection. In FIG. 1B, an RF signal 110-1 has a hollow region 112-1 in a time period 120-1. That also means the corresponding data of the hollow region 112-1 is damaged by a defect, so that the RF signal 110-1 in the time period 120-1 cannot be totally read out. But, the depth of the hollow region 112-1 is not deep as the hollow region 112 shown in FIG. 1A since it might just result from a shallow defect, such as a shallow scratch. An RFLVL signal 114-1 shows the envelope of the RF signal 110-1. A detection threshold 130-1 is a fixed DC referred voltage level like the detection threshold 130 shown in FIG. 1A. Obviously, the RFLVL signal 114-1 is always higher than the detection threshold 130-1 because the shallow defect does not make the hollow region 112-1 deep enough. Hence, not only a defect flag signal 140-1 has no response to the shallow defect, but also a FE/TE signal 150-1 has no apparently change except a little noise. Furthermore, since the shallow defect is not detected, some protective methods and devices are not triggered to protect the system from the potential disturbance and instability. In other words, the servo systems and the data path control systems are easily affected by the disturbance and instability in this defect situation.

Figure 1C:
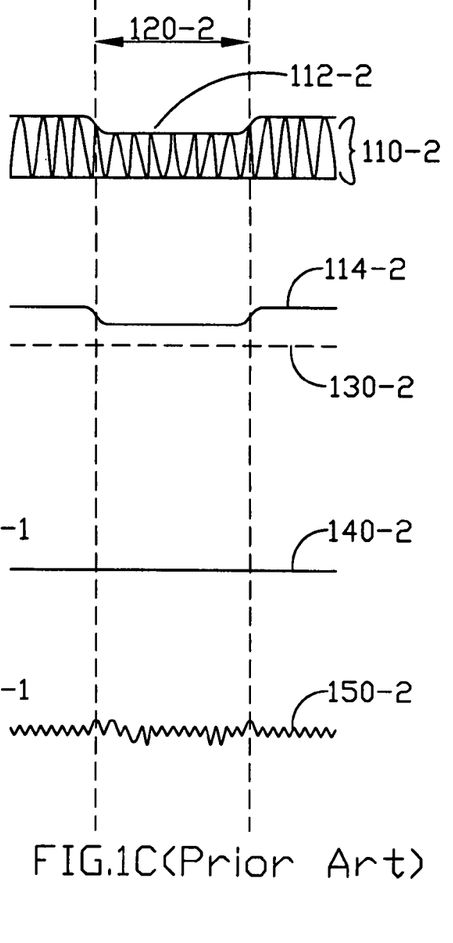
FIG. 1C illustrates signals of a fingerprint detected by applying well-known RFLVL detection.

Similarly, referring to FIG. 1C, illustrating signals of a fingerprint detected by applying well-known RFLVL detection, an RF signal 110-2 has a hollow region 112-2 in a time period 120-2. That means the corresponding data of the hollow region 112-2 is slightly affected by a defect, so that the RF signal 110-2 in the time period 120-2 has weaker amplitudes. Also, the depth of the hollow region 112-2 is not deep like the hollow region 112-1 shown in FIG. 1B, since it might just result from a shallow defect, such as a fingerprint. An RFLVL signal 114-2 shows the envelope of the RF signal 110-2 and a detection threshold 130-2 is a fixed DC referred voltage level like the detection threshold 130 shown in FIG. 1A. The RFLVL signal 114-2 is always higher than the detection threshold 130-2 in this defect situation, because the shallow defect does not make the hollow region 112-2 deep enough. Thus, not only a defect flag signal 140-2 has no response to the shallow defect, but also a FE/TE signal 150-2 has no apparently change except a little noise. This situation is similar to the situation described in FIG. 1B; the servo systems and the data path control systems cannot be safely protected. On the other hand, however, the defects shown in FIG. 1B and FIG. 1C further include different statuses according to their damaged depth, width and direction; some defects might still have original data, but others have only destroyed data. Therefore, it is difficult to determine the defect flag signal simply by the detection threshold comparison.

In view of the drawbacks mentioned with the prior art of device protection, there is a continued need to develop a new and improved method and device that overcomes the disadvantages associated with the prior art of device protection. The advantages of this invention are that it solves the problems mentioned above.

SUMMARY OF THE INVENTION

A device for protecting a slicer in reading signals on a defect disc from disturbance and instability is provided. The device includes a defect detection unit, a slicer and a logic combination unit. The defect detection unit receives a plurality of defect detection signals to detect various defects for setting a plurality of defect flag signals, wherein the plurality of defect detection signals at least include an envelope signal of a RF signal and bit modulation signals. The slicer receives and digitalizes the RF signal. The logic combination unit performs logic operation on the defect flag signals in order to detect a specified defect and to trigger defect protection for the slicer.

The present invention further discloses a method for protecting a slicer in reading signals on a defect disc from disturbance and instability. The method receives a plurality of defect detection signals for setting a plurality of defect flag signals, wherein the plurality of defect detection signals at least include an envelope signal of a RF signal and bit modulation signals. Afterward logic operation is performed on the defect flag signals in order to detect a specified defect. When a specified defect is detected, the RF signal is high-pass filtered by different cut-off frequency and bandwidth.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Figure 2:
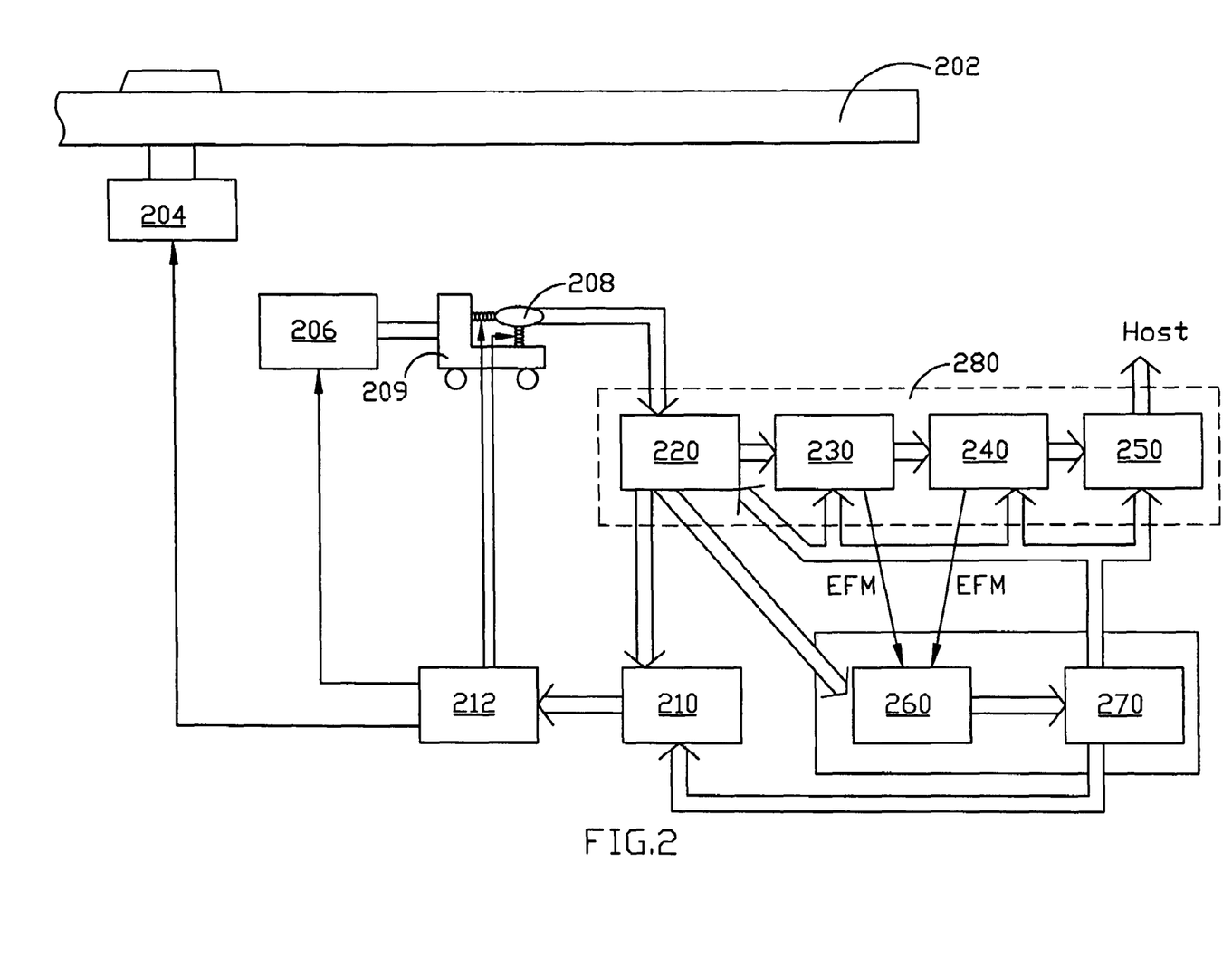
FIG. 2 illustrates a schematic defect detection device block diagram in accordance with the present invention.

FIG. 2 illustrates a schematic defect detection device block diagram in accordance with the present invention. In FIG. 2, a servo control unit 210 handles the related electromechanical devices, such as the spin rate of a spindle motor 204, the move of a sled motor 206, and the slightly tracking and focusing move of a lens 208, through a power driver 212. That is, the servo control unit 210 can make the lens 208 not only aim at the right track of a disc 202 but also have a well focus for data reading and transferring. Through roughly moving a pick-up head 209 and slightly tracking move of the lens 208 at the horizontal direction, and slightly focusing move of the lens 208 at the vertical direction, the servo control unit 210 can make the lens 208 focus well on the right track of the disc 202. A data path control unit 280 includes a preamplifier 220, a slicer 230, a phase lock loop (PLL) 240, and a decoder 250. The preamplifier 220 receives data signals from the pick-up head 209 and generates various signals, such as RF signals for data process, servo control signals, i.e. a FE/TE signal, for the servo control unit 210, and other signals, such as bit modulation signals, i.e. eight to fourteen bit modulation (EFM) signals and RF level (RFLVL) signals, etc., for defect detection. The slicer 230 digitalizes the RF signals transferred from the preamplifier 220. The PLL 240 synchronizes the digitalized RF signals to a system clock and counts the length of the digitalized RF signals according to the system clock. The decoder 250 decodes the length of the digitalized RF signal to a host (not shown).

A defect detection unit 260 receives the various signals from the preamplifier 220, and EFM signals from the slicer 230 and the PLL 240 to detect different kinds of defects through different defect detections to set corresponding defect flag signals. Wherein, the different defect detections include ADefect detection, ADefect1 detection, EFMDefect detection, RPDefect detection, Interruption detection, and DSPDefect detection, so as to set ADefect flag signal, ADefect1 flag signal, EFMDefect flag signal, RPDefect flag signal, Interruption flag signal and DSPDefect flag signal. A microprocessor or a Digital Signal Processor (DSP) could be used as the defect detection unit 260. The firmware of the foregoing defect detections could be stored in the detection unit 260 to perform corresponding defect detection. A logic combination unit 270 performs an appropriate logic operation, simply, such as an OR operation or an AND operation, on the defect flag signals to precisely improve the defect detection. As the operation result indicates in a defect situation, the logic combination unit 270 triggers defect protection methods and devices to protect the corresponding units, such as the servo control unit 210, the preamplifier 220, the slicer 230, the PLL 240, and the decoder 250.

Figure 3A:
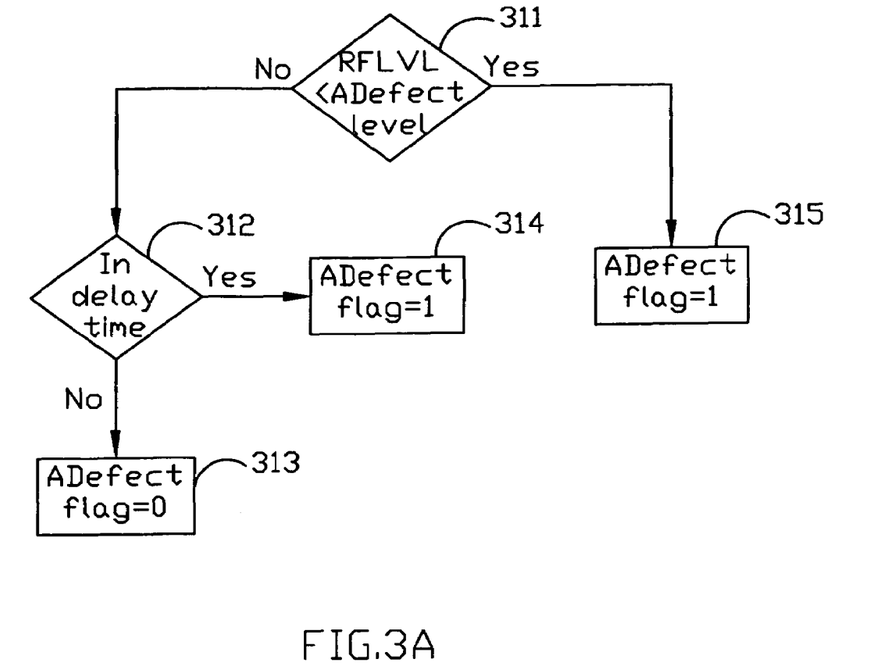
FIGS. 3A~3F illustrate flow charts of some defect detection in according with the present invention.

FIGS. 3A~3F show the flow charts of defect detection method in accordance with present invention. Referring to FIG. 3A, ADefect detection is illustrated. In step 311, comparing an RFLVL signal with an ADefect level. Wherein the RFLVL signal is the envelope of an RF signal and the ADefect level is a fixed DC referred voltage level. An ADefect flag is set to "1" in step 315 while the RFLVL signal is lower than the ADefect level. When the RFLVL signal is higher than the ADefect level, and then judging whether the RFLVL signal is in defect delay time or not (step 312). In step 314, the ADefect flag is set to "1" while the RFLVL signal is in defect delay time. However, while the RFLVL signal is higher than the ADefect level and is not in the defect delay time, the ADefect flag is set to "0" in step 313. The ADefect detection is appropriately used for detecting a deep defect, such as a scratch. When the ADefect flag signal transit from "0" to "1", it means a defect is detected.

Figure 3B:
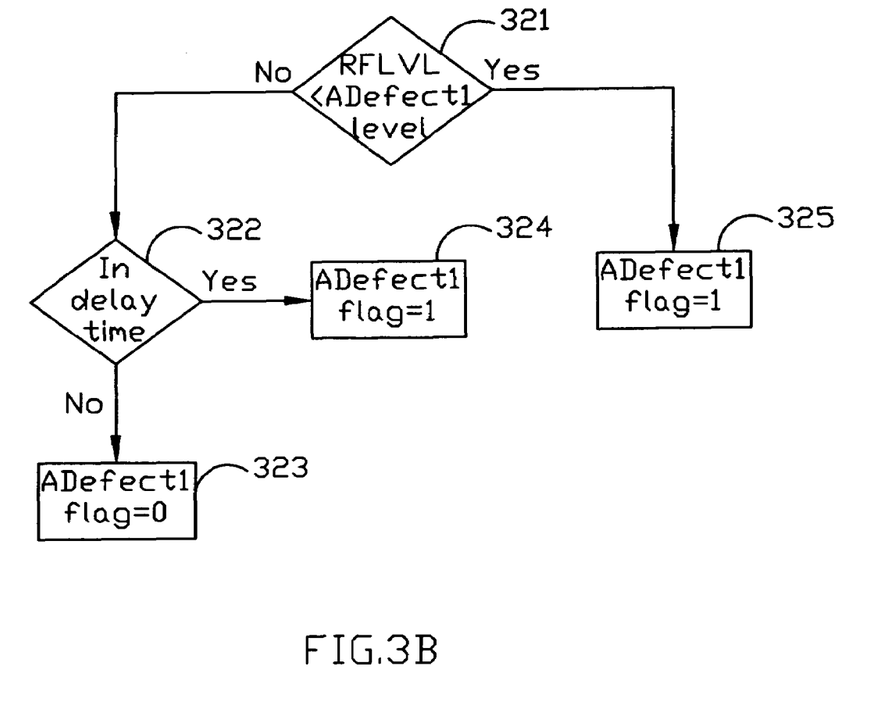

Referring to FIG. 3B, the flow charts of ADefect1 detection is illustrated. All steps in FIG. 3B are similar to those in FIG. 3A. In step 321, comparing an RFLVL signal with an ADefect1 level. Wherein the RFLVL signal is the envelope of an RF signal and the ADefect1 level is a fixed DC referred voltage level. The difference between the ADefect level and ADefect1 level is that the ADefect1 level is higher than the ADefect level. Hence, the ADefect1 detection is more sensitive than ADefect detection for shallow defect and fingerprint. An ADefect1 flag is set to "1" in step 325 while the RFLVL signal is lower than the ADefect1 level. When the RFLVL signal is higher than the ADefect1 level, and then judging whether the RFLVL signal is in defect delay time or not (step 322). In step 324, the ADefect1 flag is set to "1" while the RFLVL signal is in defect delay time. However, while the RFLVL signal is higher than the ADefect1 level and is not in the defect delay time, the ADefect1 flag is set to "0" in step 323. When the ADefect1 flag signal transit from "0" to "1", it means a defect is detected.

Figure 3C:
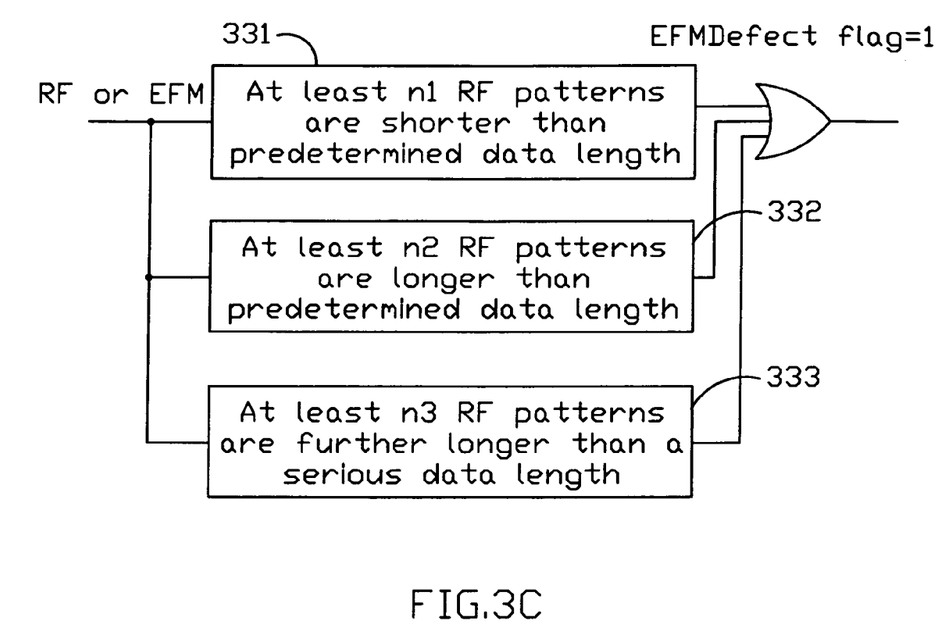

Referring to FIG. 3C, the flow charts of EFMDefect detection is illustrated. In step 331, while a data sector or a data frame has at least n1 RF patterns are shorter than a first predetermined data length, the EFMDefect flag is set to "1". For example, the first predetermined data length is 3 T for both CD and DVD data. In step 332, while the data sector or the data frame has at least n2 RF patterns are longer than a second predetermined data length, the EFMDefect flag is set to "1". For example, the second predetermined data length is respectively 11 T and 14 T for CD and DVD data. In step 333, while the data sector or the data frame has at least n3 RF patterns are longer than a serious data length, such as 18 T, the EFMDefect flag is set to "1". On the other hand, while a data sector or a data frame has at least n4 RF patterns are between the first and the second predetermined data length, the EFMDefect flag is set to "0". The EFMDefect detection is appropriately used for detecting an abnormal data length and it is real-time defect detection. Wherein, the EFMDefect detection is more sensitive while the variables n1, n2, n3, and n4 have small values. When the EFMDefect flag signal transit from "0" to "1", it means a defect is detected.

Figure 3D:
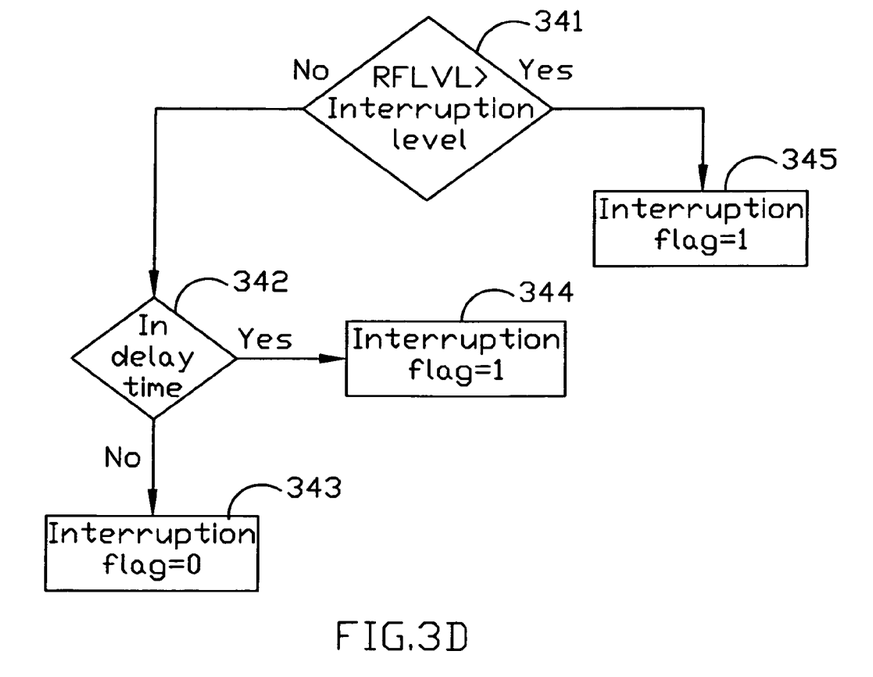

Referring to FIG. 3D, the flow charts of Interruption detection is illustrated. All steps in FIG. 3D are similar to those in FIG. 3A. In step 341, comparing an RFLVL signal with an Interruption level. Wherein the RFLVL signal is the envelope of an RF signal and the Interruption level is a fixed DC referred voltage level. The Interruption level setting is higher than the RFLVL signal in order to detect a defect resulted from strong reflection. An Interruption flag is set to "1" in step 345 while the RFLVL signal is higher than the Interruption level. When the RFLVL signal is lower than the Interruption level, and then judging whether the RFLVL signal is in defect delay time or not (step 342). In step 344, the Interruption flag is set to "1" while the RFLVL signal is in defect delay time. However, while the RFLVL signal is lower than the Interruption level and is not in the defect delay time, the Interruption flag is set to "0" in step 343. When the Interruption flag signal transit from "0" to "1", it means a defect is detected.

Figure 3E:
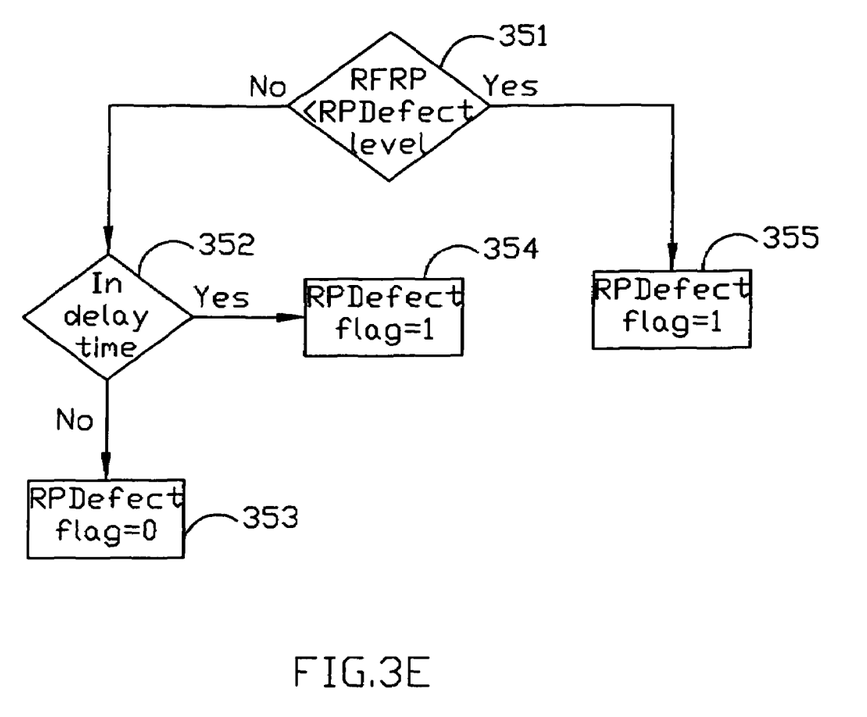

Referring to FIG. 3E, the flow charts of RPDefect detection is illustrated. All steps in FIG. 3E are similar to those in FIG. 3A. In step 351, comparing an RFRP signal with an RPDefect level. Wherein the RFRP signal could be the peak or the bottom envelope of an RF signal and also could be the peak to the bottom of the RF signal, and the RPDefect level is a fixed DC referred voltage level. An RPDefect flag is set to "1" in step 355 while the RFRP signal is lower than the RPDefect level. When the RFRP signal is higher than the RPDefect level, and then judging whether the RFRP signal is in defect delay time or not (step 352). In step 354, the RPDefect flag is set to "1" while the RFRP signal is in defect delay time. However, while the RFRP signal is higher than the RPDefect level and is not in the defect delay time, the RPDefect flag is set to "0" in step 353. When the Interruption flag signal transit from "0" to "1", it means a defect is detected. The RPDefect detection detects a defect via further processing the RF signal thus it is more sensitive for detecting defects. Due to its sensitive ability to detect defects, the RPDefect detection is suitably used to detect a small scratch and an interruption defect.

Figure 3F:
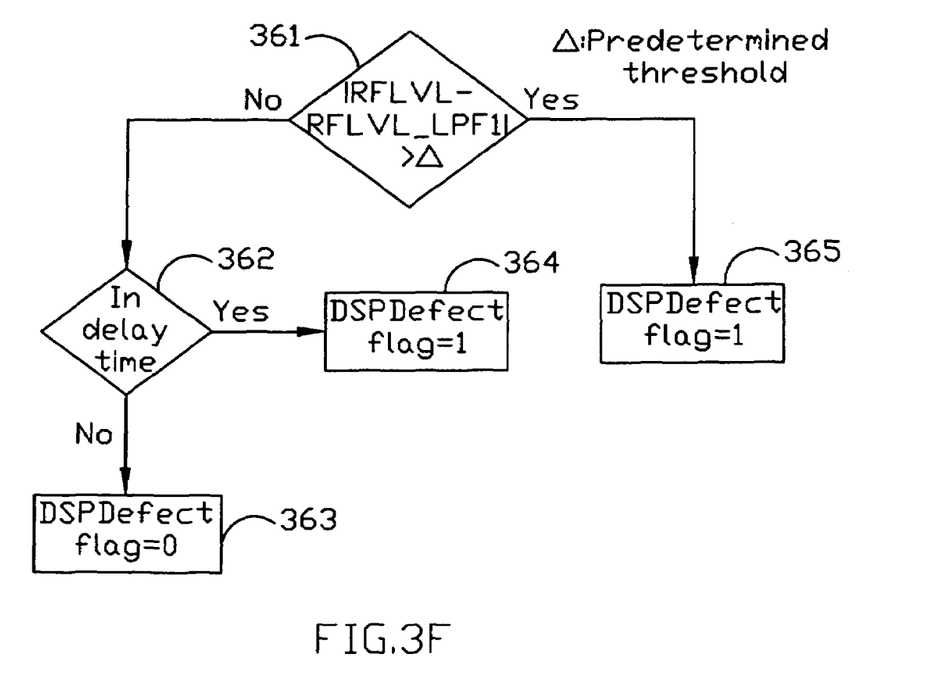

Referring to FIG. 3F, the flow charts of DSPDefect detection is illustrated. All steps in FIG. 3F are similar to those in FIG. 3A. In step 361, comparing an absolute difference value between an RFLVL and an RFLVL_LPF with a predetermined threshold. Wherein, the RFLVL_LPF signal is a slowly falling signal of the RFLVL signal passed a low pass filter. A DSPDefect flag is set to "1" in step 365 while an absolute difference value between an RFLVL and an RFLVL_LPF is bigger than the predetermined threshold. When the absolute difference value between the RFLVL and the RFLVL_LPF is smaller than the predetermined threshold, and then judging whether the moment is in defect delay time or not (step 362). In step 364, the DSPDefect flag is set to "1" while the moment is in defect delay time. However, When the absolute difference value between the RFLVL and the RFLVL_LPF is smaller than the predetermined threshold and the moment is not in the defect delay time, the DSPDefect flag is set to "0" in step 363. When the DSPDefect flag signal transit from "0" to "1", it means a defect is detected. The DSPDefect detection detects a defect through a variable threshold thus a fixed DC referred voltage level is unnecessary.

Figure 4:
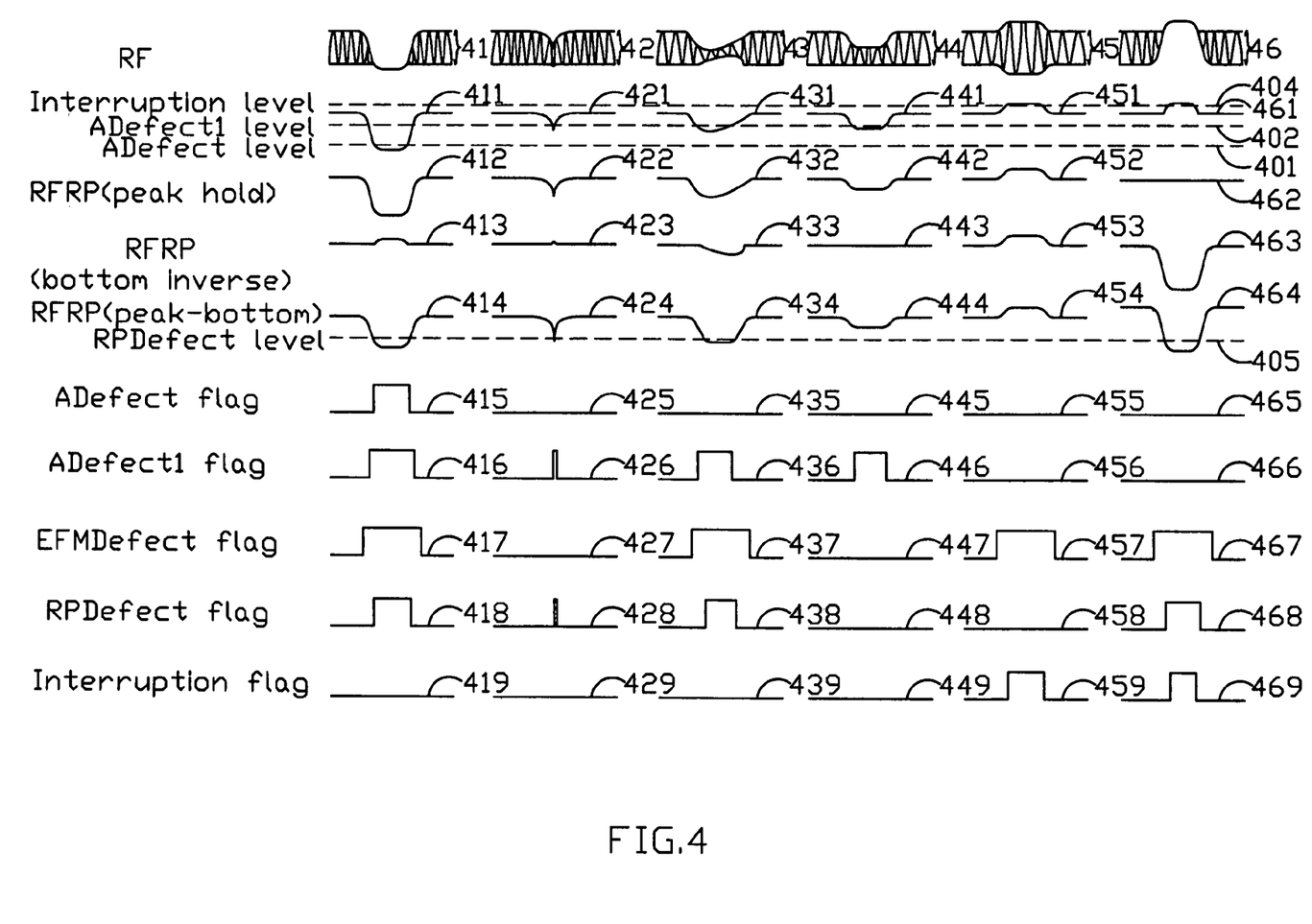
FIG. 4 illustrates different defect signals detected by applying some defect detection in accordance with the present invention.

As shown in FIG. 4, some defect signals detected by applying the defect detection in accordance with the present invention are illustrated. An RF signal 41 has a deep hollow thus its envelope signal 411 also has the deep hollow. According to the ADefect1 and the ADefect detection mentioned before, an ADefect1 flag signal 416 and an ADefect flag signal 415 are respectively set from "0" to "1" while the envelope signal 411 is lower than an ADefect1 level 402 and an ADefect level 401. The EFMDefect flag signal 417 is set from "0" to "1" as well because the hollow is wide enough and generates abnormal data length. The Interruption flag signal 419 has no response to the hollow since the envelope signal 411 is always smaller than an Interruption level 404. An RFRP signal (peak hold) 412 and an RFRP (bottom-inverse) signal 413 respectively show the peak envelope and the inversed bottom envelope of the RF signal 41. Further, an RFRP (peak-bottom) signal 414 is formed through the RFRP (peak hold) signal 412 subtracting the RFRP (bottom-inverse) signal 413. An RPDefect flag signal 418 is set from "0" to "1" as the RFRP (peak-bottom) signal 414 is lower than an RPDefect level 405. The deep hollow caused by a deep defect, such as a scratch, can be detected out through the ADefect, the ADefect1, the EFMDefect, and the RPDefect detections, since its depth and width are deep and wide enough for those defect detections.

An RF signal 42 has a shallow and narrow hollow thus its envelope signal 421 also has the same form. According to the ADefect1 detection, an ADefect1 flag signal 426 is set from "0" to "1" while the envelope signal 421 is lower than the ADefect1 level 402. An RFRP (peak hold) signal 422 and an RFRP (bottom-inverse) signal 423 respectively show the peak envelope and the inversed bottom envelope of the RF signal 42. Further, an RFRP (peak-bottom) signal 424 is formed through an RFRP (peak hold) signal 422 subtracting an RFRP (bottom-inverse) signal 423. An RPDefect flag signal 428 is set from "0" to "1" as the RFRP (peak-bottom) signal 424 is lower than the RPDefect level 405. However, an ADefect flag signal 425, an EFMDefect flag signal 427, and an Interruption flag signal 429 have no response to the shallow and narrow hollow, since the envelope signal 421 is always higher than the ADefect level 401, unsatisfying the conditions of the EFMDefect detection mentioned before, and is always lower than the Interruption level 404, respectively. The shallow and narrow hollow probably caused by a shallow scratch can be only detected out through the ADefect1 and the RPDefect detection, since its depth and width are insufficient for other defect detection.

An RF signal 43 has a shallow and wide hollow thus its envelope signal 431 also has the same form. An ADefect1 flag signal 436 is set from "0" to "1" while the envelope signal 431 is lower than the ADefect1 level 402. An EFMDefect flag signal 437 is set from "0" to "1" as well, because the hollow is wide enough and generates abnormal data length. An RFRP (peak hold) signal 432 and an RFRP (bottom-inverse) signal 433 respectively show the peak envelope and the inversed bottom envelope of the RF signal 43. Further, an RFRP (peak-bottom) signal 434 is formed through the RFRP (peak hold) signal 432 subtracting the RFRP (bottom-inverse) signal 433. An RPDefect flag signal 438 is set from "0" to "1" as the RFRP (peak-bottom) signal 434 is lower than the RPDefect level 405. However, an ADefect flag signal 435 and an Interruption flag signal 439 have no response to the shallow and width hollow, since the envelope signal 431 is always higher than the ADefect level 401 and is always lower than the Interruption level 404. The shallow and wide hollow possibly caused by a shallow defect can be only detected out through the ADefect1, the EFMDefect and the RPDefect detection, since its depth and width are insufficient for other defect detections.

An RF signal 44 has a shallow and wide hollow thus its envelope signal 441 also has the same form. An ADefect1 flag signal 446 is set from "0" to "1" while the envelope signal 441 is lower than the ADefect1 level 402. An RFRP (peak hold) signal 442 and an RFRP (bottom-inverse) signal 443 respectively show the peak envelope and the inversed bottom envelope of the RF signal 44. Further, an RFRP (peak-bottom) signal 444 is formed through the RFRP (peak hold) signal 442 subtracting the RFRP (bottom-inverse) signal 443. An RPDefect flag signal 448 has no response to the shallow and width hollow, since the RFRP (peak-bottom) signal 444 is always higher than the RPDefect level 405. Moreover, an ADefect flag signal 445, an EFMDefect flag signal 447, and an Interruption flag signal 449 neither have no response to the shallow and wide hollow, since the envelope signal 441 is always higher than the ADefect level 401, unsatisfying the conditions of the EFMDefect detection mentioned before, and is always lower than the Interruption level 404, respectively. The shallow and wide hollow probably resulted from a fingerprint can be just detected out via the ADefect1 detection in this situation, since its depth and width are very deficient for other defect detections.

As for an RF signal 45 and an RF signal 46, both of them are caused from strong signal strengths, such as strong optical reflection, also called an interruption defect. The RF signal 45 has strong amplitudes at its peak and its bottom envelope thus its peak envelope signal 451 has the corresponding form. An EFMDefect flag signal 457 is set from "0" to "1" since the interruption defect is wide enough and generates abnormal data length. An Interruption flag signal 459 is also set from "0" to "1" as the envelope signal 451 is higher than the Interruption level 404. As for other flag signals, an ADefect1 flag signal 456 and an ADefect flag signal 455 have no response to the envelope signal 451 because the envelope signal 451 is always higher than the ADefect1 level 402 and the ADefect level 401. An RFRP (peak hold) signal 452 and an RFRP (bottom-inverse) signal 453 respectively show the peak envelope and the inversed bottom envelope of the RF signal 45. Further, an RFRP (peak-bottom) signal 454 is formed through the RFRP (peak hold) signal 452 subtracting the RFRP (bottom-inverse) signal 453. An RPDefect flag signal 458 has no response to this kind of interruption defect, since the RFRP (peak-bottom) signal 454 is higher than the RPDefect level 405 at all times. This kind of interruption defect can be just detected out via the EFMDefect and the Interruption detection mentioned before.

The RF signal 46 forms an inversed hollow from its bottom envelope thus its peak envelope signal 461 has the corresponding form. An EFMDefect flag signal 467 is set from "0" to "1" since the interruption defect is wide enough and generates abnormal data length. An RFRP (peak hold) signal 462 and an RFRP (bottom-inverse) signal 463 respectively show the peak envelope and the inversed bottom envelope of the RF signal 46. Further, an RFRP (peak-bottom) signal 464 has a deep hollow formed by the RFRP (peak hold) signal 462 subtracting the RFRP (bottom-inverse) signal 463. An RPDefect flag signal 468 is set from "0" to "1" while the RFRP (peak-bottom) signal 464 is lower than the RPDefect level 405. An Interruption flag signal 469 is set from "0" to "1" while the envelope signal 461 is higher than the Interruption level 404. However, an ADefect1 flag signal 466 and an ADefect flag signal 465 have no response to the signal 461 because the envelope signal 461 is higher than the ADefect1 level 402 and the ADefect level 401. This kind of interruption defect can be only detected out via the EFMDefect, the RPDefect, and the Interruption detection mentioned before.

Generally speaking, the ADefect1 detection is more suitable than the ADefect detection for small and shallow scratch detection. The RPDefect detection is more sensitive for small scratch detection. Hence, it should be understood that the defect detection mentioned in the present invention could be combined in variety for particular defect detection. For example, combining the ADefect1 and the EFMDefect detection via a logic "OR" operation for small scratch detection, or combining the ADefect1 and the EFMDefect detection via a logic "AND" operation for small scratch detection except unwanted fingerprint, etc.

Through applying aforementioned defect detection and a suitable combination thereof to trigger a protection method and device, a slicer can be protected from instability. Wherein, the suitable combination prefers the EFMDefect detection. However, it should be understood that the aforementioned defect detection could trigger the protection method and device by individual and various combinations.

Figure 5A:
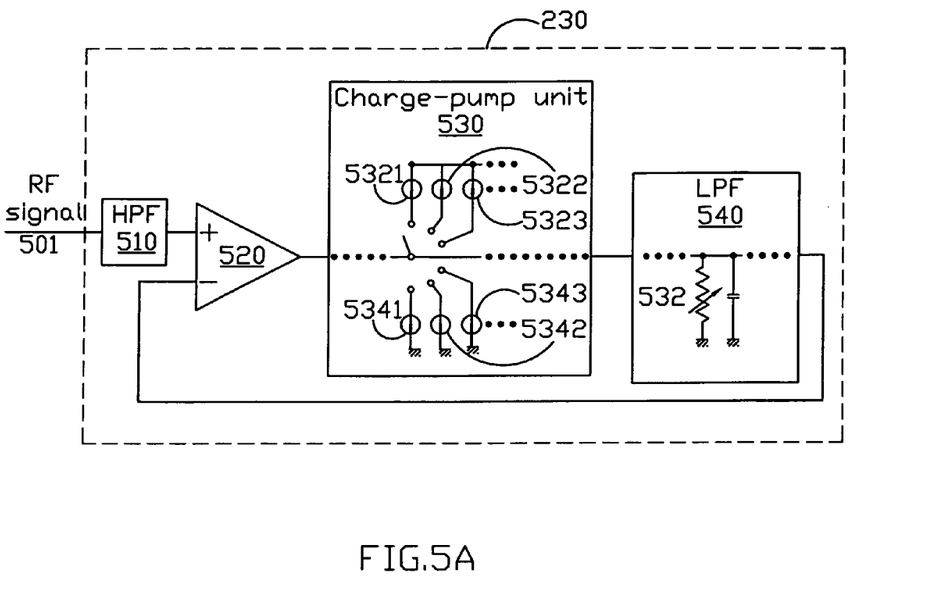
FIG. 5A and FIG. 5B illustrate a preferred embodiment of the slicer in accordance with the present invention and related signals thereof.

FIG. 5A shows a preferred embodiment of slicer 230 in accordance with present invention. In FIG. 5A, a slicer 230 includes a high pass filter 510, a comparator 520, a charge-pump unit 530, and a low pass filter 540. The high pass filter 510 filters an RF signal 501 received from a preamplifier 220 (not shown), so that the RF signal 501 are transformed into an high-pass-filtered RF signal. Then, the high-pass-filtered RF signal is compared with a referred DC level through the comparator 520 to generate a digitalized RF signal. The charge-pump unit 530 includes a plurality of current sources, such as current sources 5321, 5322, 5323, 5341, 5342 and 5343, etc., to compensate the digitalized RF signal. The digitalized RF signal is filtered by the low pass filter 540 to generate a slice level to feedback to the comparator 520 as the referred DC level.

Figure 5B:
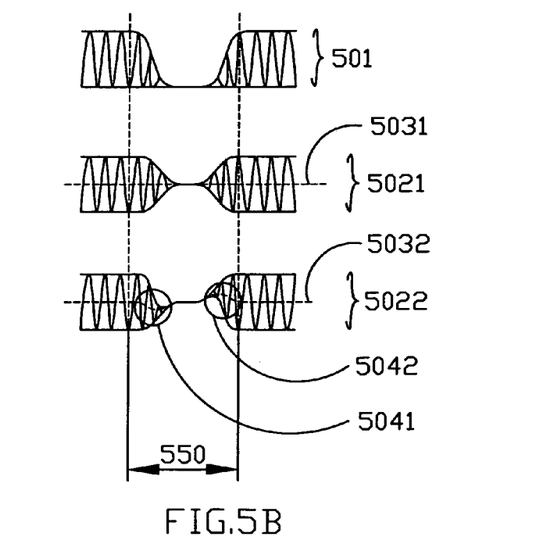

FIG. 5B shows the waveform diagram of the RF signal 501, high-pass-filtered RF signal 5021 and 5022 while a defect is detected. In general, when the optical disc has a deep defect, the RF signal 501 received from the preamplifier 220 (not shown) is as shown in FIG. 5B, wherein the time period 550 has a hollow region. At the ideal status, the low frequency of the RF signal 501 is filtered by the high pass filter 510 to generate a high-pass-filtered RF signal 5021. The high-pass-filtered RF signal 5021 is symmetrical to a linear slice level 5031. Thereafter, the high-pass-filtered RF signal 5021 is compared with a referred DC level through the comparator 520 to generate a digitalized RF signal. The charge-pump unit 530 compensates the digitalized RF signal by different current sources. The digitalized RF signal is filtered by the low pass filter 540 to generate a slice level to feedback to the comparator 520 as the referred DC level.

However, while the bandwidth of the high pass filter 510 is not wide enough, the low frequency of the RF signal 501 can not be completely filtered by the high pass filter 510 and leads to a high-pass-filtered RF signal 5022 is produced. The main difference between the high-pass-filtered RF signals 5021 and 5022 is that the high-pass-filtered RF signal 5022 is asymmetrical to a non-linear slice level 5032 in the time period 550 unlike the RF signal 5021 to a linear slice level 5031. Also, the non-linear slice level 5032 has a little fluctuation in the regions 5041 and 5042. This situation can be improved through increasing the bandwidth of the high pass filter 510, and/or choosing appropriate charge-pump current in the charge pump unit 530 to pull up/down the high-pass-filtered RF signal 5022 and to compensate the non-linear slice level 5032. Hence, the high pass filter 510 provides different cut-off frequency and bandwidth to generate a suitable RF signal 501, when a defect is detected.

Thereafter, the high-pass-filtered RF signal 5022 is compared with a referred DC level through the comparator 520 to generate a digitalized RF signal. The charge-pump unit 530 compensates the digitalized RF signal by different current sources. The digitalized RF signal is filtered by the low pass filter 540 to generate a slice level to feedback to the comparator 520 as the referred DC level. The low pass filter 540 further compensates the non-linear slice level 5032, particularly in the region between 5041 and 5042, by adjusting the resistance of variable resistor 532 to improve the linearity of the non-linear slice level 5032 so that the different cut-off frequency and bandwidth could be obtained. Furthermore, the output voltage of the slicer 230 can also be hold to be a fixed voltage value before the defect in order to protect the slicer 230 itself from instable caused by the defect.

Although specific embodiments have been illustrated and described, it will be obvious to those skilled in the art that various modifications may be made without departing from what is intended to be limited solely by the appended claims.

What is claimed is:

1. A device for protecting a slicer in reading signals on a defect optical disc from disturbance and instability, said device comprising:
   a defect detection unit, receiving a plurality of defect detection signals for setting a plurality of defect flag signals, wherein said plurality of defect detection signals at least include an envelope signal of a RF signal and bit modulation signals;
   said slicer, receiving and digitalizing said RF signal comprising:
      a high pass filter, filtering said RF signal to generate a high-pass-filtered RF signal;
      a comparator electrically connected to said high pass filter, comparing said high-pass-filtered RF signal from said high pass filter with a referred DC level to generate a digitalized RF signal;
      a charge-pump unit electrically connected to said comparator, comprising a plurality of current sources to compensate said digitalized RF signal from said comparator; and
      a low pass filter electrically connected to said charge-pump unit and said comparator, filtering said digitalized RF signal from said charge-pump unit and generates a slice level to feedback to said comparator as said referred DC level; and
   a logic combination unit, performing logic operation on said defect flag signals in order to detect a specified defect and to trigger defect protection for said slicer.

2. The device according to claim 1, wherein said RF signal is generated by a preamplifier.

3. The device according to claim 1, wherein said high pass filter provides different cut-off frequency and bandwidth to filter said RF signal when said specified defect is detected.

4. The device according to claim 1, wherein said charge-pump unit provides said plurality of current sources to compensate said high-pass-filtered RF signal when said specified defect is detected.

5. The device according to claim 1, wherein said low pass filter compensates said slice level by a variable resistor so as to improve linearity of said slice level.

6. A method for protecting a slicer in reading signals on a defect optical disc from disturbance and instability, said device comprising steps of:
   receiving a plurality of defect detection signals for setting a plurality of defect flag signals, wherein said plurality of defect detection signals at least include an envelope signal of a RF signal and bit modulation signals;
   performing logic operation on said defect flag signals in order to detect a specified defect;
   passing high frequencies of said RF signal to generate a high-pass-filtered RF signal by a high pass filter;
   comparing said high-pass-filtered RF signal with a referred DC level by a comparator electrically connected to said high pass filter, to generate a digitalized RF signal;
   providing a plurality of current sources by a charge-pump unit electrically connected to said comparator, to compensate said digitalized RF signal;
   passing low frequencies of said digitalized RF signal and generating a slice level as said referred DC level by a low pass filter electrically connected to said charge-pump unit; and
   using different cut-off frequency and bandwidth to pass the high frequencies of said RF signal when said specified defect is detected.

7. The method according to claim 6, wherein said RF signal is generated by a preamplifier.

8. The method according to claim 6, further comprising step of:
   compensating said slice level by a variable resistor so as to improve linearity of said slice level when said specified defect is detected.

* * * * *